(12) United States Patent
Yen et al.

(10) Patent No.: US 7,933,319 B2
(45) Date of Patent: Apr. 26, 2011

(54) SIGNAL PROCESSING CIRCUIT

(75) Inventors: Kuang-Yu Yen, Tai Chung (TW);
Chung-Yao Chang, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 751 days.

(21) Appl. No.: 11/984,780

(22) Filed: Nov. 21, 2007

(65) Prior Publication Data

US 2008/0123724 A1    May 29, 2008

(30) Foreign Application Priority Data

Nov. 24, 2006   (TW) .............................. 95143473 A

(51) Int. Cl.
*H04B 1/38*   (2006.01)
*H04L 5/16*   (2006.01)

(52) U.S. Cl. ........ 375/220; 375/219; 375/222; 375/300; 375/320; 375/223; 455/552.1; 455/73; 455/84; 455/104; 455/146

(58) Field of Classification Search ................. 375/220, 375/219, 222, 223, 295, 316, 300, 320; 455/73, 455/67, 84, 88, 103–105, 108, 146, 552.1, 118
See application file for complete search history.

(56) References Cited

U.S. PATENT DOCUMENTS

| 5,280,644 A | 1/1994 | Vannatta et al. |
| 2005/0020298 A1* | 1/2005 | Masumoto et al. ........ 455/552.1 |

\* cited by examiner

*Primary Examiner* — Phuong Phu
(74) *Attorney, Agent, or Firm* — Muncy, Geissler, Olds & Lowe, PLLC

(57) ABSTRACT

A signal processing system is disclosed. The system includes: a first synthesizer and a second synthesizer, for respectively generating a first frequency and a second frequency; a first RF circuit; a first analog front end (AFE); a second RF circuit; and a second AFE, wherein the first RF circuit and the first AFE can support a signal transmission of a first bandwidth, the second RF circuit and the second AFE can support a signal transmission of a second bandwidth, a central frequency of the first bandwidth is substantially equal to the first frequency, and a central frequency of the second bandwidth is substantially equal to the second frequency.

20 Claims, 9 Drawing Sheets

SIGNAL PROCESSING CIRCUIT

BACKGROUND OF THE INVENTION

1. Field of the Invention

The present invention relates to a signal processing circuit, and more particularly, to a signal processing circuit having a plurality of frequency synthesizers.

2. Description of the Related Art

In wireless local-area network (WLAN) applications, in order to achieve higher transmission speed and better transmission quality, the signal processing circuit often supports a multiple-input multiple-output (MIMO) technique. The MIMO technique uses multiple antennas to receive (and transfer multiple signal streams.

In addition, in order to increase the transmission speed, a common solution implemented is to increase the transmission bandwidths of the signals. For example, in a traditional WLAN system, the signal bandwidth is 20 MHz. However, WLAM systems can often support 40 MHz-bandwidth data transmission.

Please refer to FIG. 1. FIG. 1 is a diagram of a conventional signal processing circuit 100. As shown in FIG. 1, the signal processing circuit 100 comprises four antennas 111 through 114, an RF circuit 121, four analog front ends (AFE) circuits 131 through 134, a baseband circuit 141, and a synthesizer 151. In this case, each of the antennas 111 through 114 can receive and transfer an independent signal stream so as to support the above-mentioned MIMO technique. Please note, the functions and operations of the antennas 111 through 114, the RF circuit 121, the AFE circuits 131 through 134, and the baseband circuit 141 are well-known by those having average skill in the art, and therefore further illustrations are omitted herein.

Moreover, the RF circuit 121 can only use a single central frequency f (i.e., carrier frequency) to perform the data transmission regardless of the selected signal bandwidth (e.g., the aforementioned 20 MHz or 40 MHz) because the signal processing circuit 100 comprises only one synthesizer 151.

Please refer to FIG. 2. FIG. 2 is a simplified diagram showing output signals of the signal processing circuit 100 as shown in FIG. 1. When the signal processing circuit 100 transfers signals in a 40 MHz bandwidth, the baseband circuit 141 can only shift the frequency of the signal to be transferred 10 MHz right or left because of the limitation of having only the single synthesizer 151. In this way, the signals to be transferred change to correspond to two adjacent 20 MHz bandwidths. Next, the RF circuit 121 utilizes the central frequency f provided by the synthesizer 151 such that the signals can be carried in the 40 MHz bandwidth having the central frequency f. In this way, the signal processing circuit 100 can use the 40 MHz bandwidth instead of the original 20 MHz bandwidth to transfer data.

However, the above-mentioned structure, the single synthesizer structure, has several disadvantages. First, when the RF circuit 121 receives signals, a filtering operation is performed to derive desired signals. Please refer to FIG. 3. FIG. 3 is a diagram showing a frequency spectrum of the signal processing circuit 100 when the signal processing circuit 100 is receiving signals. As shown in FIG. 3, when the RF circuit 121 receives signals carried by the 40 MHz bandwidth, the RF circuit 121 can only set the central frequency of the filtering bandwidth as the central frequency f provided by the synthesizer 151 and the filtering bandwidth can only be 40 MHz because of the limitation of having just the single synthesizer structure. In this way, signals transferred in the two 20 MHz bandwidths interfere each other by their images (i.e., in the signal processing procedure, one signal becomes a noise for the other signal). Therefore, in the following signal analysis (e.g., in the following down-sampling operation performed by the AFE circuits 131 through 134), the processed signals may include distortions.

Furthermore, because of the limitation of having the single synthesizer structure, the signal processing circuit 100 cannot detect whether the adjacent channel is clean before switching the signal bandwidth. Therefore, when the signal processing circuit 100 changes to use the 40 MHz bandwidth to transfer data, packets to be transferred and other currently-transferring packets may encounter collisions. If the collision phenomenon is serious, the data throughput may be reduced. Therefore, it is apparent that new and improved methods and devices are needed.

SUMMARY OF THE INVENTION

In view of the above-mentioned problems, an object of the claimed invention is to provide a signal processing circuit having a plurality of synthesizers, to solve the above-mentioned problems.

According to an embodiment of the claimed invention, a signal processing circuit is disclosed. The signal processing circuit includes: a first synthesizer, for generating a first frequency; a first RF circuit, for receiving a first RF signal corresponding to a first band according to the first frequency and generating a first inner signal according to the first RF signal; a first analog front end (AFE) circuit, for receiving the first inner signal and generating the first digital signal according to the first inner signal; a second synthesizer, for generating a second frequency; a second RF circuit, for receiving a second RF signal corresponding to a second band according to the second band and generating a second inner signal according to the second RF signal; a second AFE circuit, for receiving the second inner signal and generating a second digital signal according to the second inner signal; and a baseband circuit, for processing the first digital signal and the second digital signal; wherein a central frequency of the first band is substantially equal to the first frequency, and a central frequency of the second band is substantially equal to the second frequency.

According to an embodiment of the claimed invention, a signal processing circuit is disclosed. The signal processing circuit includes: a baseband circuit, for generating a first digital signal and a second digital signal; a first AFE circuit, for receiving the first digital signal and converting the first digital signal into a first inner signal; a synthesizer, for generating a first frequency; a first RF circuit, for transforming the first inner signal into a first RF signal corresponding to a first band according to the first frequency; a second AFE circuit, for receiving the second digital signal and converting the second digital signal into a second inner signal; a second synthesizer, for generating a second frequency; and a second RF circuit, for transforming the second inner signal into a second RF signal corresponding to a second band according to the second frequency; wherein a central frequency of the first band is substantially equal to the first frequency, and a central frequency of the second band is substantially equal to the second frequency.

According to an embodiment of the claimed invention, a signal processing circuit is disclosed. The signal processing circuit includes: a synthesizer, for generating a first frequency; a first RF circuit, for receiving a first RF signal corresponding to a first band according to the first frequency and generating a first inner signal according to the first RF signal; a first AFE circuit, for receiving the first inner signal and generating a first digital signal according to the first inner signal; a baseband circuit, for processing the first digital signal and generating a second digital signal; a second AFE circuit, for receiving the second digital signal and generating a second inner signal according to the second digital signal; a second synthesizer, for generating a second frequency; and a second RF circuit, for receiving the second inner signal and generating a second RF signal corresponding to a second band according to the second inner signal and the second frequency; wherein a central frequency of the first band is substantially equal to the first frequency, and the central frequency of the second band is substantially equal to the second frequency.

According to an embodiment of the claimed invention, a wireless signal processing circuit for communicating with a network is disclosed. The network supporting data transmission via a first band or a second band, the signal processing circuit includes: a first signal transmission module, for communicating with the network device via the first band; a detecting module, for detecting whether the second band is busy and generating a detecting result; a second signal transmission module, for communicating with the network device via the second band when the detecting result represents that the second band is not busy such that the signal processing circuit is capable of communicating with the signal processing circuit via both the first band and the second band.

According to an embodiment of the claimed invention, a wireless signal processing circuit for communicating with a first network device or a second network device is disclosed. The first network device supporting data transmission via a first band, the second network device supporting data transmission via a second band, and the signal processing circuit includes: a first signal transmission module, for performing data transmission via the first band or the second band; a second signal transmission module, for performing data transmission via the second band; and a first detecting module, for detecting whether the first band is busy when the first signal transmission module transfers signals to the first network device and generating a first detecting result; a second detecting module, for detecting whether the second band is busy when the first band is busy and generate a second detecting result; wherein when the first detecting result represents that the first band is busy and the second detecting result represents that the second band is not busy, then the first signal transmission module changes to communicate with the second network device via the second band.

DETAILED DESCRIPTION OF THE INVENTION

Figure 1:
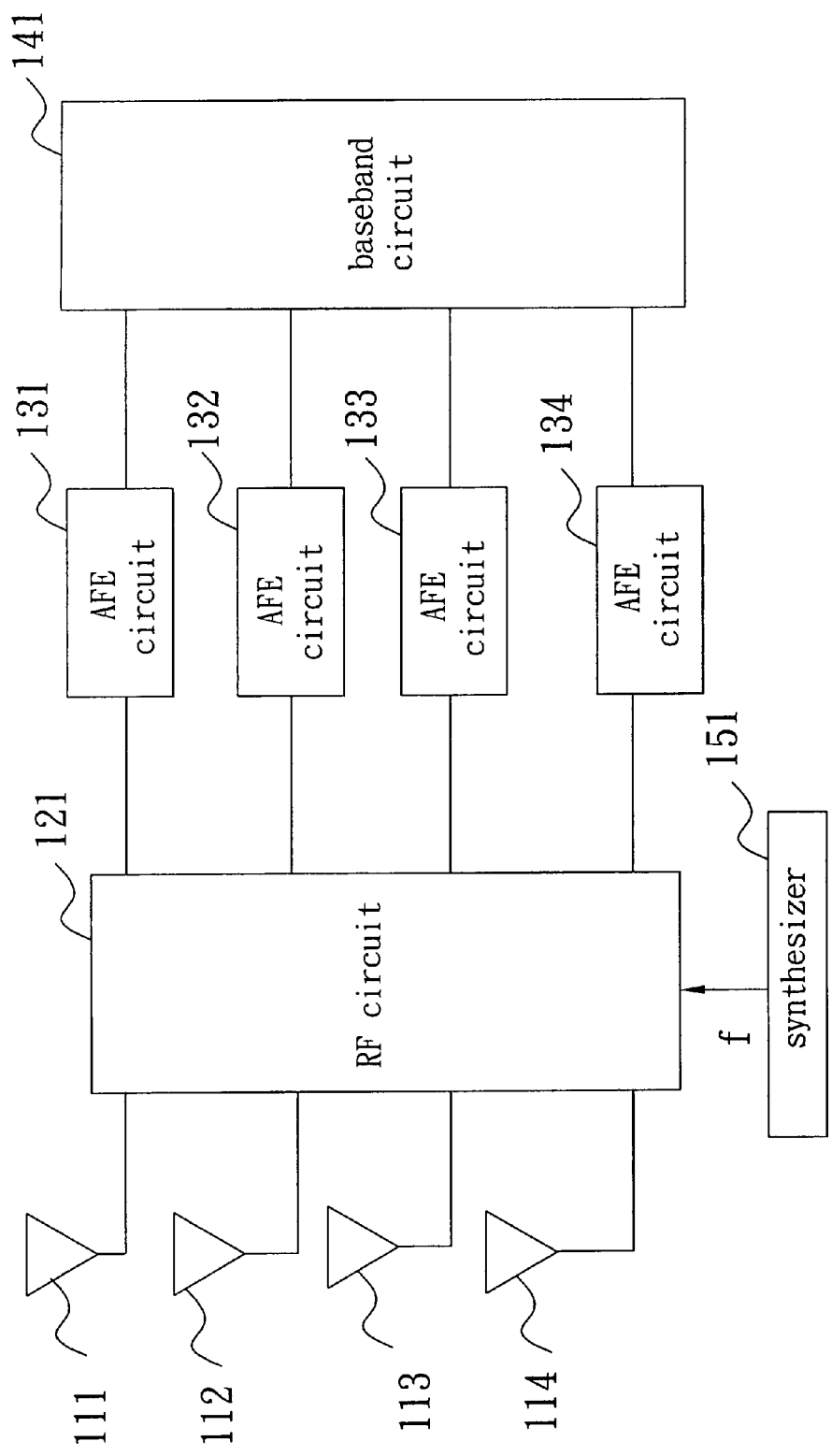
FIG. 1 is a diagram of a conventional signal processing circuit.
Figure 2:
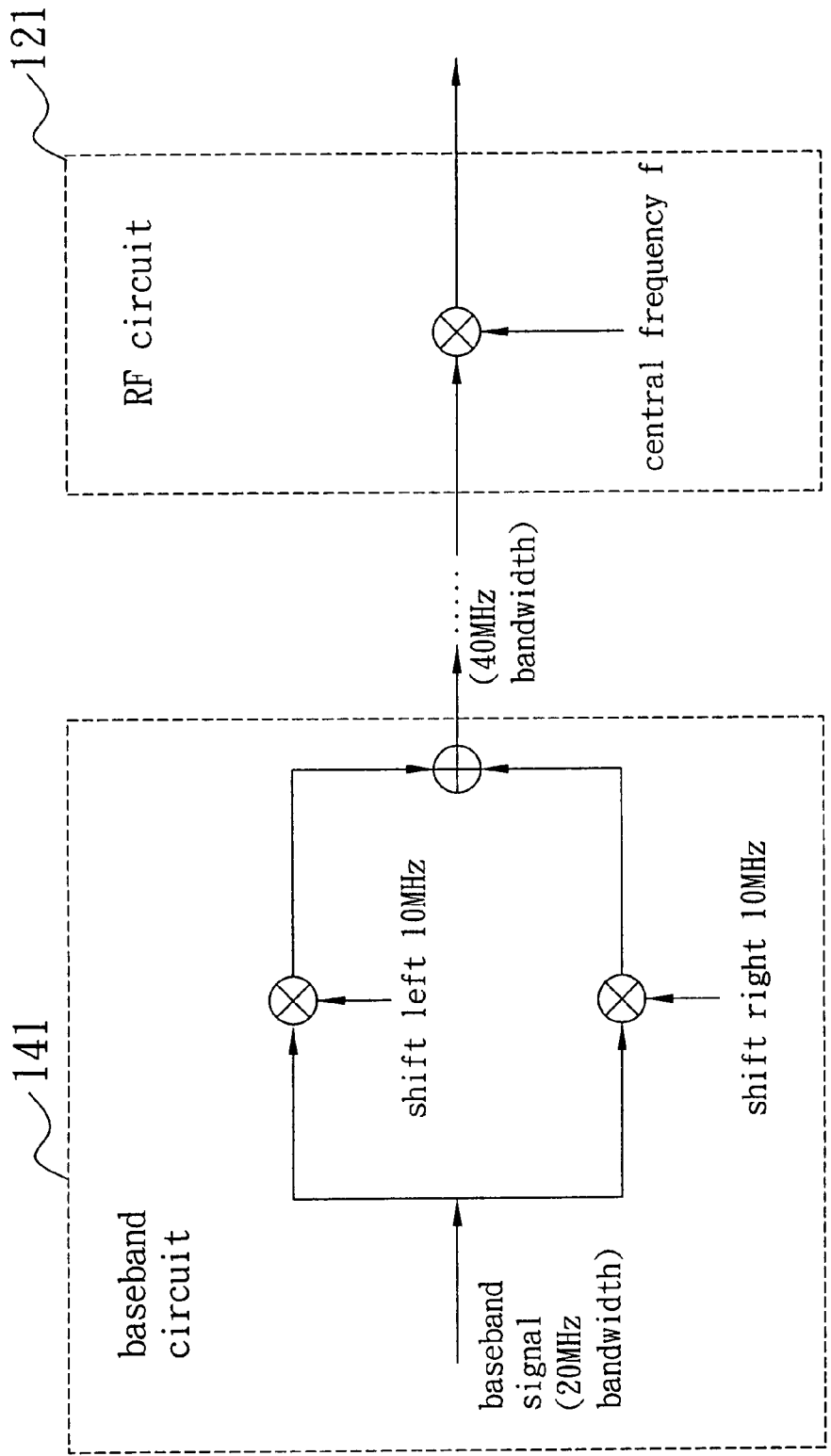
FIG. 2 is a simplified diagram showing output signals of the signal processing circuit shown in FIG. 1.
Figure 3:
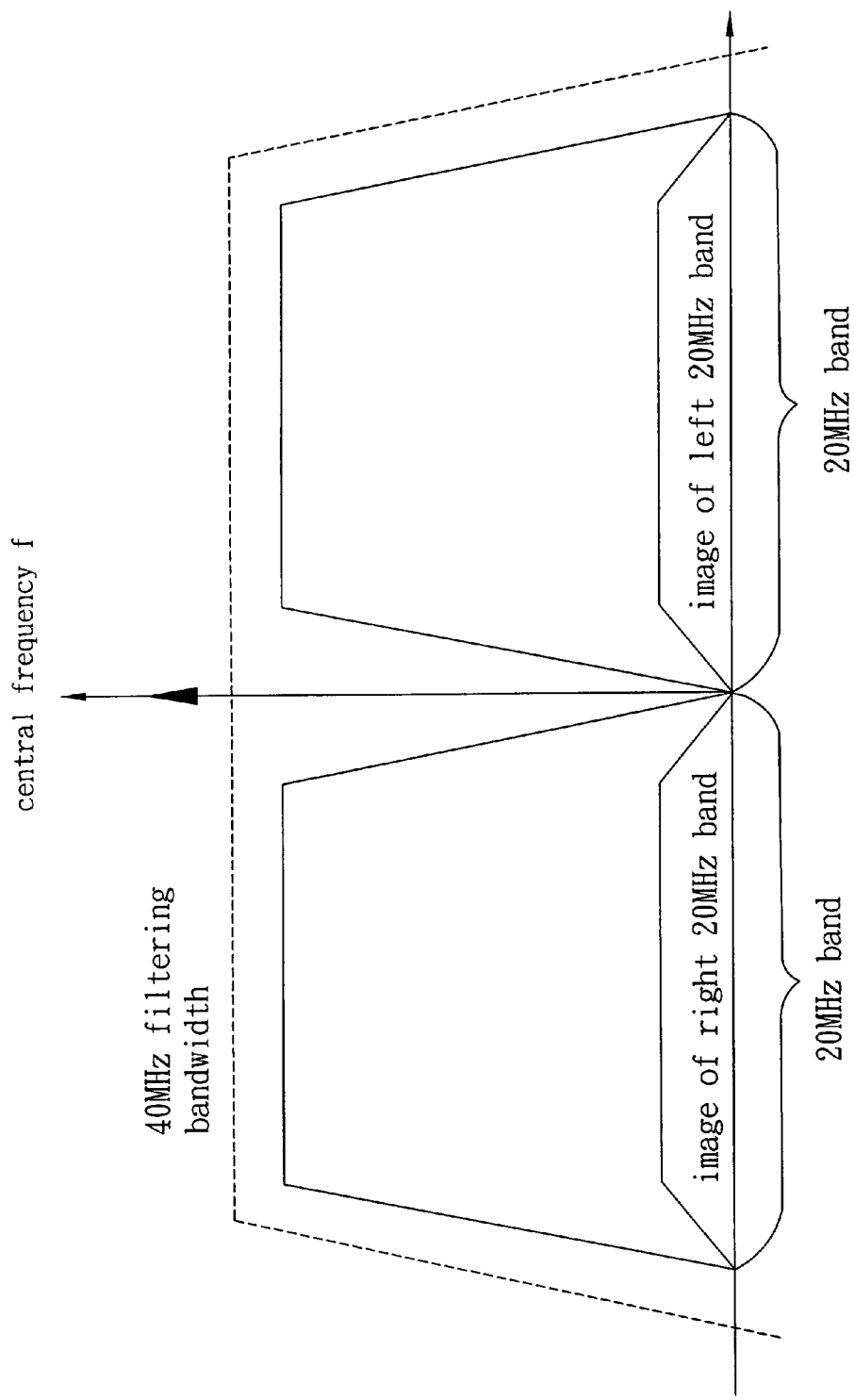
FIG. 3 is a diagram showing a frequency spectrum of the signal processing circuit 100 when the signal processing circuit shown in FIG. 1 is receiving signals.
Figure 4:
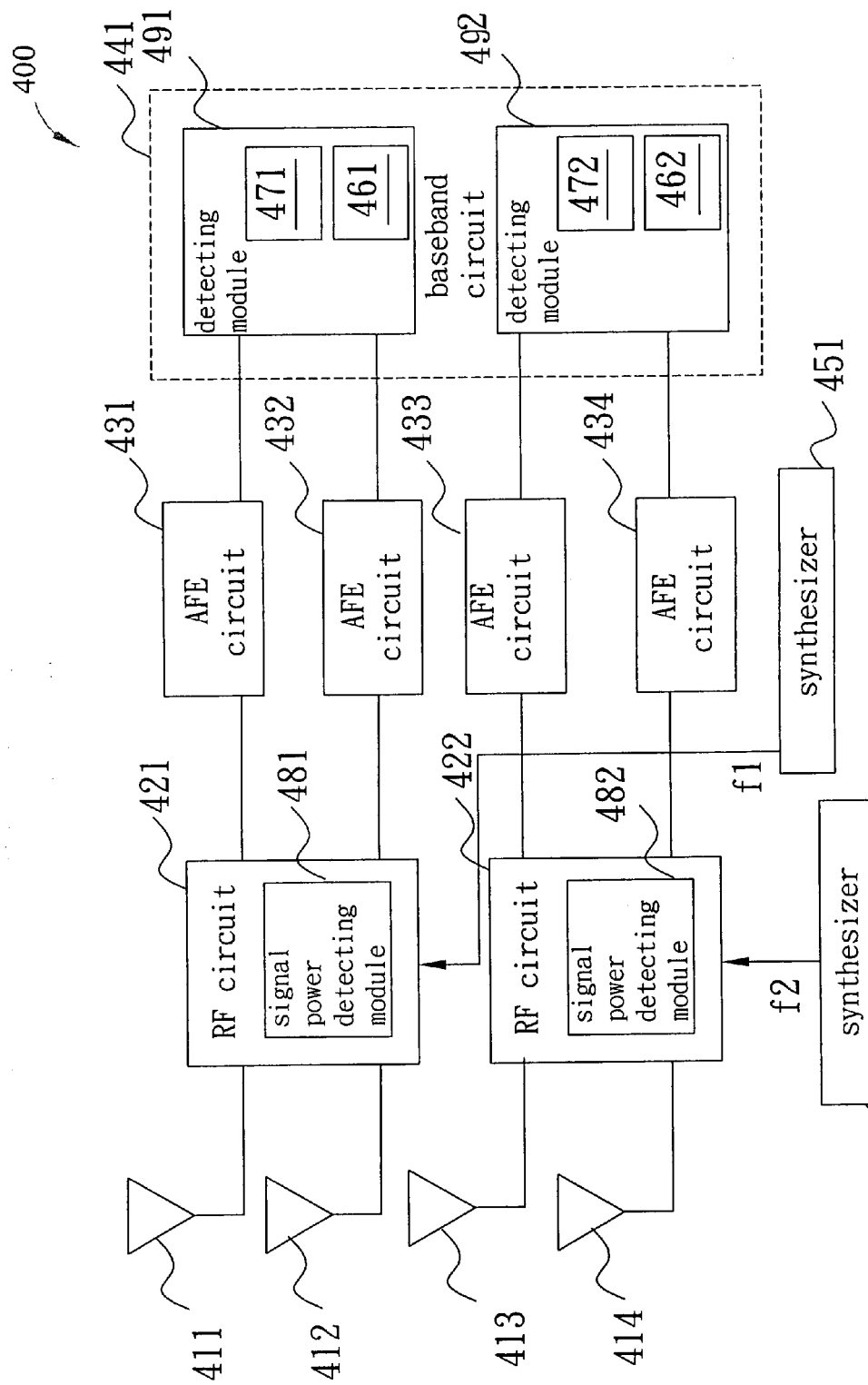
FIG. 4 is a functional block diagram of a signal processing circuit according to an embodiment of the present invention.

Please refer to FIG. 4. FIG. 4 is a functional block diagram of a signal processing circuit 400 according to the present invention. As shown in FIG. 4, the signal processing circuit 400 also comprises four antennas 411, 412, 413, and 414, two RF circuits 421 and 422, four AFE circuits 431, 432, 433, and 434, and a baseband circuit 441. However, please note, the present invention signal processing circuit 400 comprises two synthesizers 451 and 452, which are respectively used to provide frequencies f1 and f2 to the RF circuits 421 and 422.

In the processing circuit 400, each antenna 411 through 414 can receive an independent stream to support an MIMO mechanism. Each antenna and its corresponding RF circuit, AFE circuit, and synthesizer can be regarded as a signal transmission module. For example, the antenna 411 and its RF circuit 421, AFE circuit 431, and synthesizer 451 can be regarded as a signal transmission module. Please note, the functions and operations of the components of the signal processing circuit 400 will be illustrated in the following disclosure.

Please note, the names of the above-mentioned baseband circuit 441 and the RF circuit 442 only describe the utilization bands thereof, and are not limitations to the functions of said circuits. In an actual implementation, the functions and the operations of the baseband circuit 441 and the RF circuit 442 can be defined by the requirements of circuit designers. Therefore, in this embodiment of the present invention, the baseband circuit 441 not only supports the original signal transmission function, but also comprises a detecting modules 491 and 492 respectively including signal power detecting modules 461 and 462 and transmission time period detecting modules 471 and 472. Additionally, the RF circuit 442 not only supports the original signal transmission, but also comprises signal power detecting modules 481 and 482. The functions and the operations of the above-mentioned components will be illustrated later in the following disclosure.

When the signal processing circuit 400 receives signals, the antennas 411 through 414 are utilized for receiving RF signals. Furthermore, the RF circuits 421 and 422 function as a tuner. The RF circuit 421 and 422 process the RF signals received by the antennas 411 through 414 and a perform filtering operation on the RF signals according to the central frequencies f1 and f2 provided by the synthesizers 451 and 452. In this way, the RF signals corresponding to the specific band can be extracted and are therefore transformed into inner signals. For example, a down-sampling operation can be performed to transform the RF signals into MF signals. Next, the AFE circuits 431 through 434 perform a down-sampling operation on the inner signals for generating a baseband digital signal, which can be processed by the baseband circuit 441. At last, the baseband circuit 441 processes these digital signals and derives the information carried by the signals (e.g., the data transferred by the WLAN signals).

On the other hand, when the signal processing circuit 400 outputs data, inner components of the signal processing circuit 400 perform a "reverse" operation to output signals to a network device. That is, at this time, the baseband circuit 441 is utilized for generating a baseband digital signal to be transferred, where the digital signal carried information to be transferred. Next, the AFE circuits 431 through 434 transform the digital signals into analog inner signals. At last, the RF circuits 411 and 412 utilize the central frequencies f1 and f2 provided by the synthesizers 451 and 452 to carry these inner signals such that the inner signals are transformed into RF signals and then transferred via the antennas 411 through 414.

Please note, in this embodiment of the present invention, for different RF circuits 421 through 422, the signal processing circuit 400 accordingly sets up two synthesizers 451 and 452. Therefore, the signal processing circuit 400 can be utilized more flexibly and does not have the same limitations as found in the prior-art single synthesizer structure.

Figure 5:
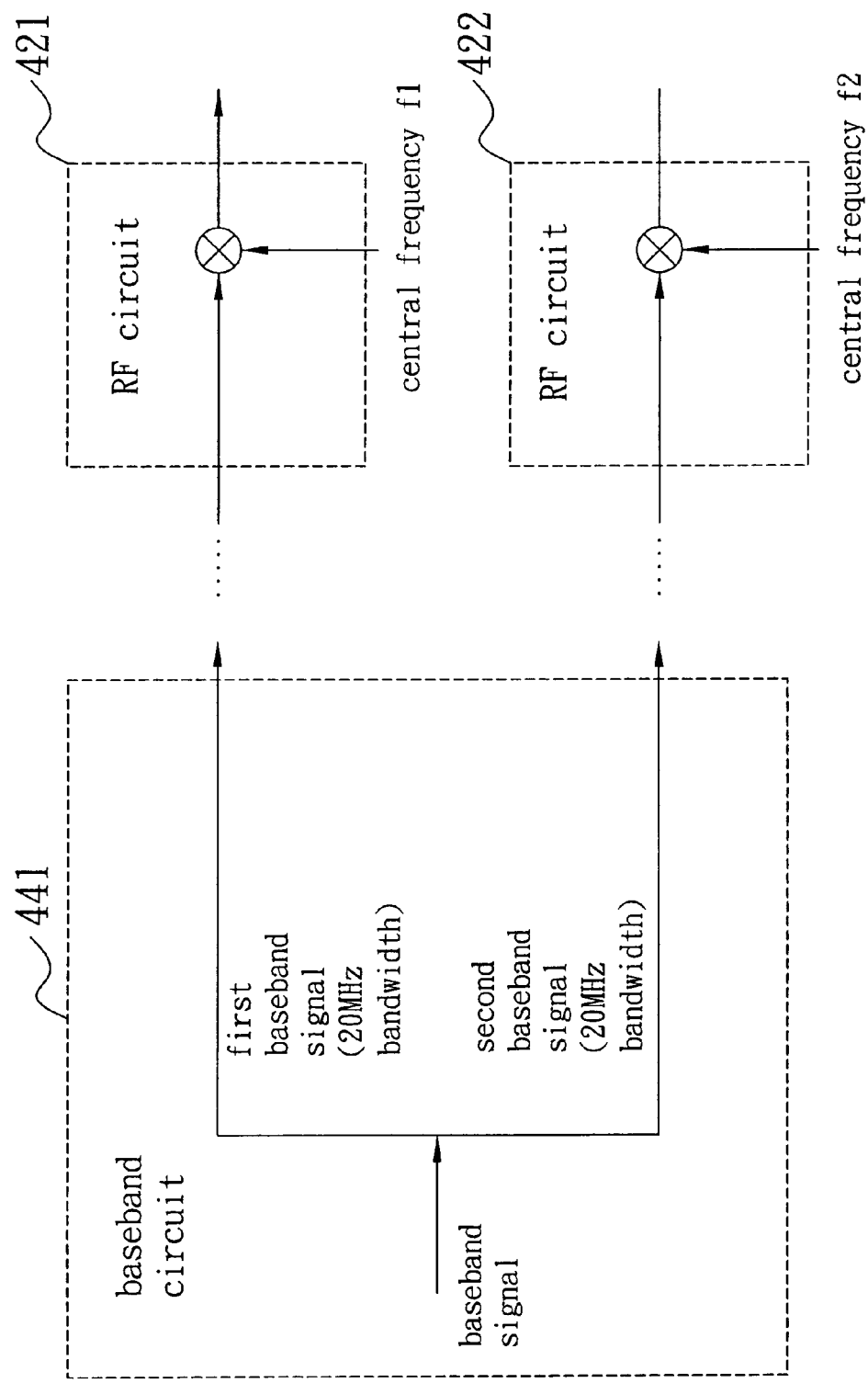
FIG. 5 is a diagram showing a frequency spectrum when the signal processing circuit shown in FIG. 4 is receiving signals.

Please refer to FIG. 5. FIG. 5 is a diagram showing a frequency spectrum when the signal processing circuit 400 receives signals. As shown in FIG. 5, the synthesizers 451 and 452 can be utilized to generate different frequencies f1 and f2 for the RF circuits 421-422 to use. Therefore, when the RF circuits 421 and 422 receive signals from a 40 MHz band, the RF circuits 421 and 422 can respectively set different filtering bands according to different central frequencies f1 and f2 in order to respectively receive signals from individual two 20 MHz bands. In this way, the RF circuits 421 and 422 perform filtering operations on individual 20 MHz bands. Therefore, in the following operations (e.g., a signal analysis), the signals are not influenced by their images and the distortions are reduced.

Figure 6:
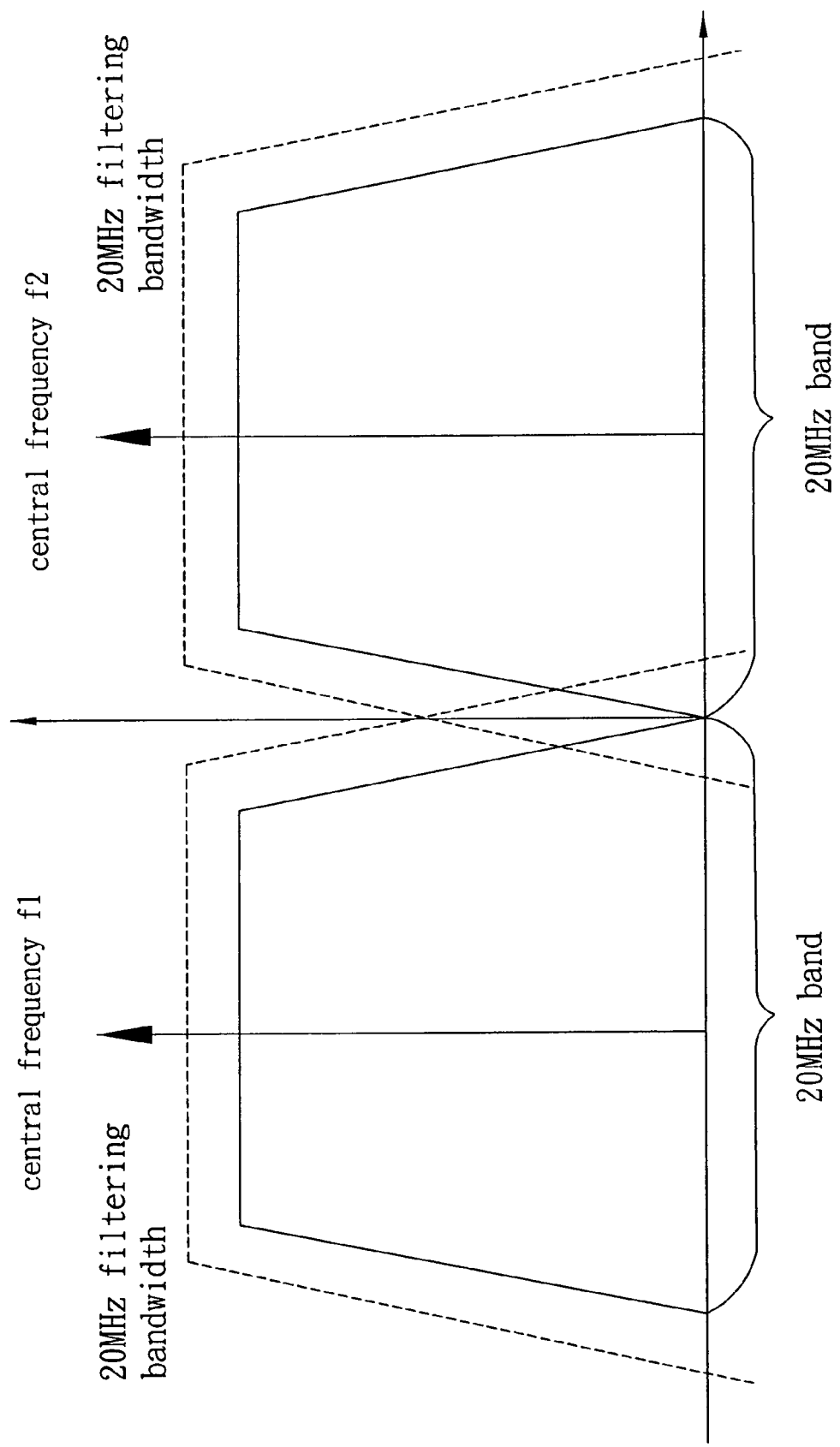
FIG. 6 is a simplified diagram showing when the signal processing circuit shown in FIG. 4 is outputting signals.

Please refer to FIG. 6. FIG. 6 is a simplified diagram showing the signal processing circuit 400 when outputting signals. As shown in FIG. 6, the signal processing circuit 400 comprises two synthesizers 451 and 452. Therefore, in contrast to the conventional signal processing circuit 100, the baseband circuit 441 can directly output baseband digital signals to be transferred using different individual 20 MHz bands. In this way, the following RF circuits 421 and 422 can respectively use different frequencies f1 and f2 to transfers the signals via different 20 MHz bands.

In the above disclosure, it can be seen that the signal processing circuit 400 comprises two RF circuits working in conjunction with two synthesizers. Therefore, the signal processing circuit 400 has greater flexibility when using different bands. As mentioned previously, if the central frequencies f1 and f2 differ from each other by about 20 MHz and the RF circuits 421 and 422 support 20 MHz filtering bandwidths, then the signal processing circuit 400 can support the effect of two adjacent 20 MHz bands mechanism, and thereby reducing the image interference phenomenon.

Furthermore, the above-mentioned signal processing circuit 400 can support other operations. For example, when the frequencies f1 and f2 provided by the synthesizers 451 and 452 are the same and two RF circuits 421 and 422 (i.e., four antennas 411 through 414) use the same filtering bandwidth, the signal processing circuit 400 can simultaneously receive and transfer signals via the same bandwidth. (i.e., supporting the same 20 MHz band).

On the other hand, when the difference between the central frequencies f1 and f2, provided by the synthesizers 451 and 452, is larger than 20 MHz, the RF circuits 411 and 412 (i.e., four antennas 411 through 414) can simultaneously receive and transfer signals via two non-adjacent bands. In other words, the present invention can utilize two non-adjacent bands to achieve 40 MHz-bandwidth data transmission. For example, the characteristics of adjacent channels may result in not the best conditions, or an adjacent channel may be occupied by other uses. In this case, the present invention can utilize the synthesizers 451 and 452 to transfer data via different bands.

Please note, the present invention does not limit the frequency of the central frequencies f1 and f2. The designers can set the central frequency according to their requirements. This change also obeys the spirit of the present invention.

Moreover, under this structure, the signal processing circuit 400 can first detect the data flow of an extension band before switching the transmission band. In this way, the packet collision phenomenon can be avoided after the transmission band is changed.

Figure 7:
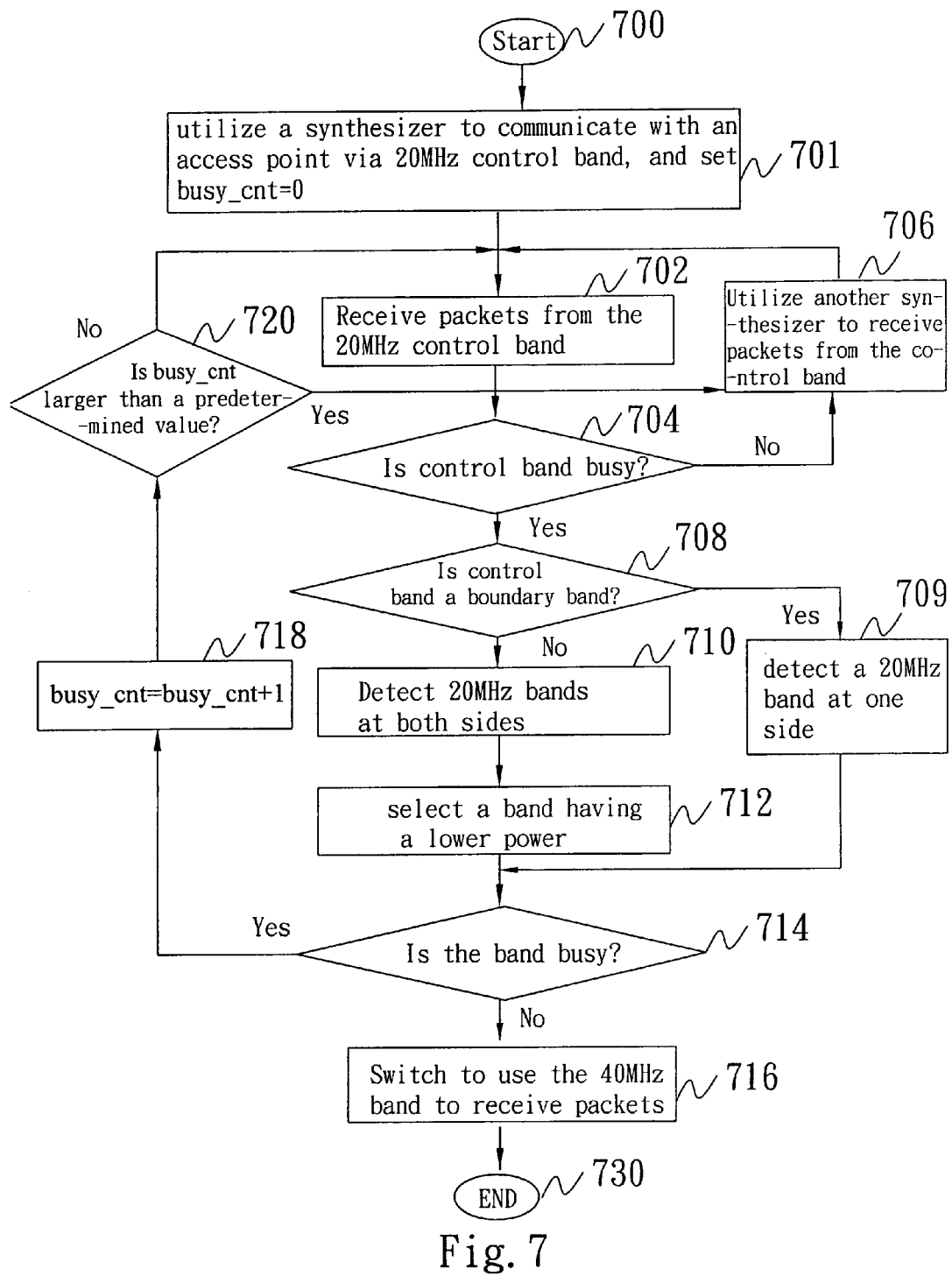
FIG. 7 is a flow chart showing when the signal processing circuit shown in FIG. 4 communicates with an access point.

Please refer to FIG. 7. FIG. 7 is a flow chart showing the signal processing circuit 400 when communicating with an access point. Please note, the access point supports 20 and 40 MHz data transmission. Furthermore, the illustrations in the following disclosure are simplified, specifically, the original 20 MHz transmission band, initially established between the signal processing circuit 400 and the access point, is called as a control channel, and the additional 20 MHz band, which is established after the transmission band is broaden from 20 MHz to 40 MHz, is called an extension channel. The flow chart comprises the following steps:

Step 700: Start.
Step 701: Utilize the synthesizer 451 to communicate with an access point in a 20 MHz bandwidth transmission mode, and set busy_cnt=0.
Step 702: Receive packets in a 20 MHz control channel.
Step 704: Detect whether the control channel is busy. If it is, then go to step 708; otherwise, go to step 706.
Step 706: Simultaneously utilize the synthesizer 452 to receive packets via the control channel to further improve the transmission condition of the packets.
Step 708: Detect whether the control band is a boundary band. If it is, then go to step 709; otherwise, go to step 710.
Step 709: Detect an adjacent 20 MHz band at only one side of the control channel.
Step 710: Detect adjacent 20 MHz bands at both sides of the control channel.
Step 712: Select one adjacent 20 MHz band corresponding to a lower signal power.
Step 714: Detect whether the band is busy. If it is, then go to step 718; otherwise, go to step 716.
Step 716: Switch to utilize the 40 MHz bandwidth to receive packets. Go to step 730.
Step 718: Set busy_cnt=busy_cnt+1
Step 720: If busy_cnt is larger than a predetermined value, then go to step 706; otherwise, go to step 702.
Step 730: Finish.

As is well-known by those having average skill in the art, before performing signal transmission operations, the signal processing circuit 400 firstly performs a site survey to determine access points supporting 20/40 MHz data transmission. In addition, in an initial condition, the signal processing circuit 400 sets a register busy_cnt to 0. The function of the register will be illustrated later and is thus omitted here.

Next, the signal processing circuit 400 establishes a connection with an access point supporting 20/40 MHz data transmission according to the result of the above-mentioned site survey (step 700). Please note, as mentioned previously, the signal processing circuit 400 can utilize any one of the synthesizer 451 or the synthesizer 452 to generate a needed central frequency to achieve the purpose of establishing the connection with the access point. In this embodiment of the present invention, the signal processing circuit 400 utilizes the synthesizer 451 to establish the connection with the access point. In other words, the central frequency provided by the synthesizer 451 is equal to the central frequency of the control channel to support the signal transmission between the signal processing circuit 400 and the access point.

In this way, the signal processing circuit 400 can utilize corresponding components (i.e., the antennas 411 and 412, RF circuit 421, and AFE circuits 431 and 432) corresponding to the synthesizer 451 to receive signals from the access point via the 20 MHz control band (i.e., control channel) such that the packets can be received (step 702).

Next, when the signals are received, the baseband circuit 441 detects whether the control band is busy to determine whether to switch the 20 MHz bandwidth into the 40 MHz bandwidth in data transmission. Please note, to detect whether the control band is busy is equivalent to detecting whether the control band complies with a predetermined condition. For example, we can detect a signal power of the control band to check whether the transmission speed of the packets comply with a predetermined condition. In this embodiment of the present invention, transmission time period detecting modules 471 and 472 are embedded within the detecting modules 491 and 492 inside the baseband circuit 441. The transmission time period detecting modules 471 and 472 are utilized to execute the above-mentioned detection operations. As is well-known by one having ordinary skills in the art, when the packets are transferring, if the back-off time of one packet is very long, it means that the transmission band of the packet is very busy. Therefore, in this embodiment, the transmission time period detecting module 471 calculates an average back-off time of one packet and detects whether the average back-off time is larger than a predetermined value. The control band is considered to be busy when the average back-off time is larger than the predetermined value. As mentioned previously, it means the control band complies with a predetermined condition. Otherwise, the control band is considered to be not busy.

If the control band is not busy, then the transmission speed is sufficient and there is no need to switch the original 20 MHz into a broaden bandwidth. Therefore, at this time, the signal processing circuit 400 causes the synthesizer 452 additionally provide the frequency f1. In this way, the corresponding components (i.e., the antennas 413 and 414, the RF circuit 422, and the AFE circuits 433 and 434) corresponding to the synthesizer 452 can perform signal transmission operations with the access point via the same control band to further improve the transmission speed (step 706).

On the other hand, if the control band is busy then the transmission speed is insufficient. At this time, the signal processing circuit 400 attempts to switch the original 20 MHz bandwidth into a broaden 40 MHz bandwidth to further improve the transmission condition.

Therefore, the signal processing circuit 400 detects the condition of an extension band to determine if the bandwidth is switched. At first, the RF circuit 421 detects whether the control band is a boundary band (step 408). Next, if the control band is a boundary band, the signal processing circuit 400 detects an extensional band, adjacent to the control band, at one side of the control band (step 709).

On the other hand, if the control band is not a boundary band, the signal power detecting module 462 must work in conjunction with the synthesizer 452 to detect the signal power of adjacent extension bands at both sides of the control band (step 710) and then selects a band having lower signal power to be used as an extension band.

After the extension band is determined, the signal processing circuit 400 detects whether the extension band is busy (step 714). At this time, if the extension band is busy, the signal processing circuit 400 sets register busy_cnt=busy_cnt+1 (step 718).

In the above disclosure, the register busy_cnt is used for representing the detection results of how busy an extension band is. From another point of view, the register busy_cnt can be regarded as a time period during which the busy extension band remains busy. In this embodiment of the present invention, in order to prevent wasting system performance by repeatedly detecting whether the extension band is busy, the signal processing circuit 400 stops detecting the extension band and causes the synthesizer 452 to provide the same frequency f1 if the register busy_cnt is larger than a predetermined value. In this way, the corresponding components (i.e., the antennas 413 and 414, the RF circuit 422, and the AFE circuits 433 and 434) corresponding to the synthesizer 452 can perform the signal transmission with the access point via the control band to further improve the transmission efficiency.

On the other hand, if the extension band is not busy in step 714, the signal processing circuit 400 utilizes the synthesizer 452 to establish a connection with the access point via the extension band. In other words, at this time, the central frequency f2 provided by the synthesizer is equal to the central frequency of the extension band to support the signal transmission between the signal processing circuit 400 and the access point. In this way, the corresponding components (i.e., the antennas 413 and 414, the RF circuit 422, and the AFE circuits 433 and 434) corresponding to the synthesizer 452 can perform the signal transmission with the access point via the 20 MHz extension band to receive packets (step 716).

Therefore, the signal processing circuit 400 equivalently switches from the 20 MHz bandwidth to the 40 MHz bandwidth to support the data transmission. Please note, this includes the original 20 MHz control band and 20 MHz extension band.

Please note, in step 714, the signal processing circuit 400 can utilize other mechanisms to determine whether the extension band is busy. A first mechanism is to use a power detecting module 462 defined within the baseband circuit 441 to detect the signal power of the digital signals transferred from the AFE circuits 433 and 434. The amplitude of the signals of the extension band is not high if the signal power of the digital signals is less than a predetermined threshold. Therefore, the signal processing circuit 400 determines the extension band is not busy at that time. Alternatively, the baseband circuit 411 to calculate by what amount the signal power of the digital signals exceeds a predetermined threshold in a specific period of time to further determine a percentage when the signal power of the digital signals exceeds a predetermined threshold. This technique is called a carrier sense ratio (CSR). If the CSR is less than another predetermined threshold, then the baseband circuit 441 can determine that the extension band is not busy.

A second mechanism is to use the signal power detecting module 482 defined within the RF circuit 422 to detect the received RF signals to determine whether the extension band is busy. The quality of digital signals received by the baseband circuit is often limited by the resolution of the front-end AFE circuit, therefore, using the RF circuit is more accurate than the above-mentioned mechanism of using the baseband circuit. For example, the RF circuit can utilize the received signal strength indicator (RSSI), which is often provided by a common-used RF circuit, to represent the signal power. Similarly, if the signal power of the RF signals is less than a predetermined threshold, it indicates that the amplitude of the signals of the extension band is not high. At this time, the signal processing circuit 400 can determine that the extension band is not busy.

Similarly, the RF circuit 441 can calculate by what amount the signal power of the digital signals exceeds a predetermined threshold in a specific period of time to further determine a percentage when the signal power of the digital signals exceeds a predetermined threshold. This technique is called a carrier sense ratio (CSR). If the CSR is less than another predetermined threshold, then the RF circuit 441 can determine that the extension band is not busy.

From the above disclosure, it can be seen that the present invention can utilize multiple synthesizers and corresponding components. The present invention can firstly detect whether the extension band is busy and then decide whether to use the extension band to transfer data. Therefore, the present invention is able to prevent the packet collision problem.

In addition, besides the bandwidth switching operation, the signal processing circuit 400 can further switch the currently-connected access point to another access point without breaking the current data transmission. This can further improve communication quality. That is, the signal processing circuit 400 can communicate with a first access point via a band (i.e., channel) and simultaneously detect the signal flow of another band of a second access point. In this way, if the transmission speed of the first access point is slow and the transmission band of the second access point is not busy, the signal processing circuit 400 can switch the access point to transfer data using another access point.

Figure 8:
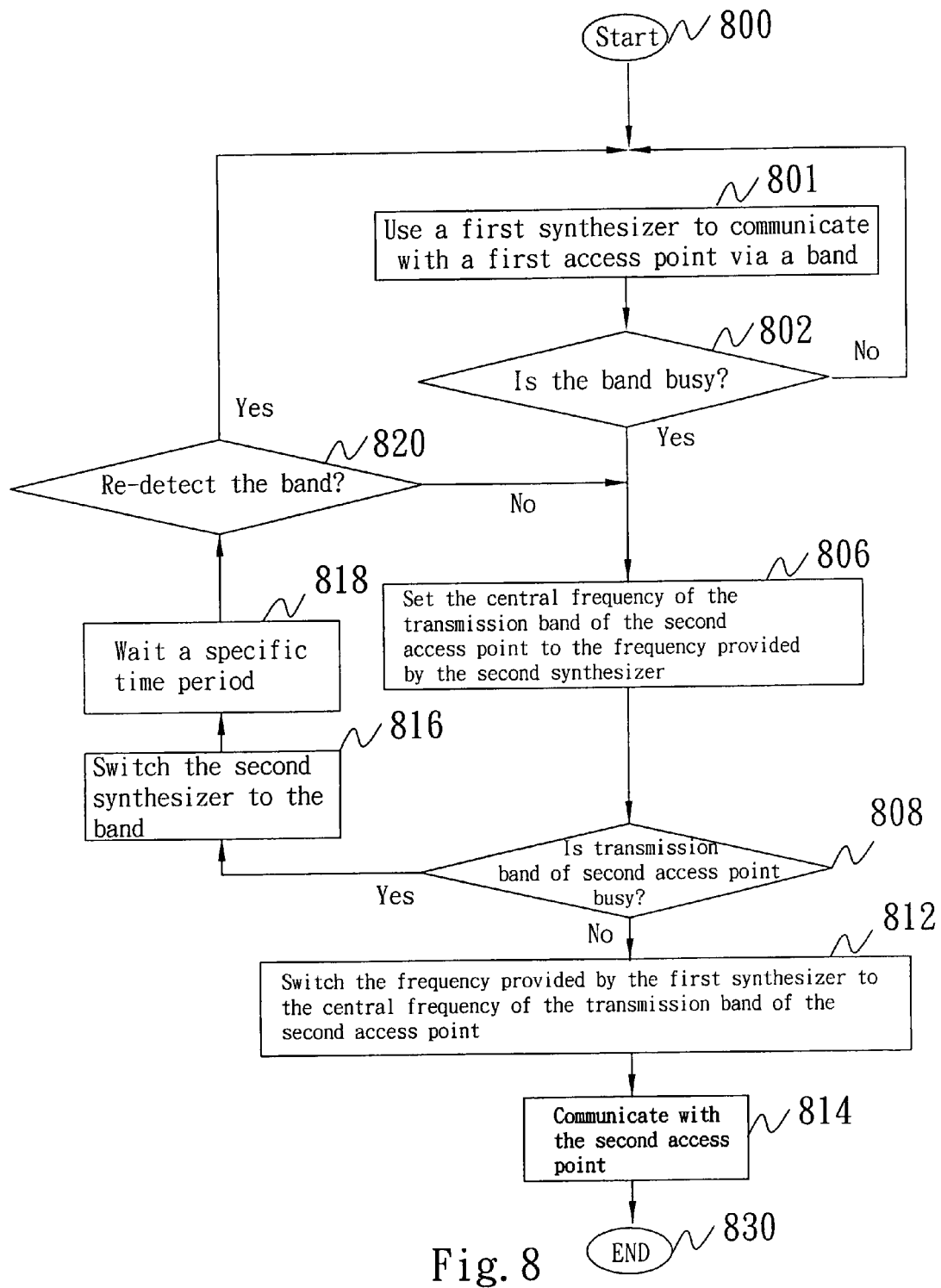
FIG. 8 is a flow chart showing when the signal processing circuit shown in FIG. 4 switches access points to support the signal transmission.

Please refer to FIG. 8. FIG. 8 is a flow chart showing the signal processing circuit 400 switching access points to support the signal transmission. The flow comprises following steps:

Step 800: Start.
Step 801: Utilize the synthesizer 451 to communicate with a first access point via a band;
Step 802: Detect whether the band is busy. If it is, then go to step 806; otherwise, go to step 800.
Step 806: Set the frequency provided by the synthesizer as a central frequency of the transmission band of a second access point.
Step 808: Determine whether the transmission band of the second access point is busy. If it is, then go to step 812; otherwise, go to step 816.
Step 812: Switch the frequency provided by the synthesizer 451 to the central frequency of the transmission band of the second access point.
Step 814: Perform data transmission between the signal processing circuit 400 and the second access point. Go to step 830.
Step 816: Switch the synthesizer 452 back to the original transmission band.
Step 818: Wait a specific time period.
Step 820: Determine whether to detect if the first band is busy. If it is, go back to step 800; otherwise, go back to step 806.
Step 830: Stop.

First, the signal processing circuit 400 establishes a connection with a first access point and starts a signal transmission (i.e., packet transmission). In this embodiment of the present invention, the signal processing circuit 400 utilizes the synthesizer 451, the antennas 411 and 412, the RF circuit 421, and the AFE circuits 431 and 432 to communicate with the first access point via a band.

Next, the signal processing circuit 400 detects whether the band is busy. As mentioned previously, the transmission time period detecting module 471 is able to calculate an averaged backoff time for a packet and check whether the averaged backoff time is larger than a predetermined threshold. If the averaged backoff time is larger than the predetermined threshold, it indicates that the band is busy, otherwise, it means that the band is not busy (step 802).

If the band is not busy, the transmission speed is sufficiently good. At this time, there is no need to change currently-connected access point. Therefore, the signal processing circuit 400 continues to communicate with the first access (e.g., the synthesizer 452 can be switched back to provide the original central frequency to support the data transmission with the first access point).

But, if the band is busy, this indicates that the transmission quality of the current connection is not good. Therefore, at this time, the signal processing circuit 400 tries to detect the conditions of other access points to determine whether other access points are available for data transmission.

Therefore, in this embodiment of the present invention, the signal processing circuit 400 sets the frequency provided by the synthesizer 452 as the central frequency of the transmission band of the second access point. In this way, the signal processing circuit 400 is able to detect the condition of the transmission band of the second access point (step 806).

Please note, in this embodiment, the mechanisms for detecting whether the transmission band is busy are quite similar to the aforementioned mechanisms, and are thus omitted herein. For example, the signal processing circuit 400 can utilize the signal power detected module 492 defined within the baseband circuit 441 or the RF circuit 421 to detect the signal power of the transmission band such that the condition of the transmission band can be detected. Alternatively, the signal processing circuit 400 can utilize the CSR to determine whether the transmission band is busy.

If the signal processing circuit 400 determines that the transmission band of the second access point is not busy, then the signal processing circuit 400 switches the frequency f1 provided by the synthesizer 451 to the central frequency of the transmission band of the second access point (step 812) to communicate with the second access point. In other words, the signal processing circuit 400 can switch to use the transmission band of the second band thereby using all of the components of the signal processing circuit 400 to communicate with the second access point (step 814).

On the other hand, if the signal processing circuit 400 determines that the transmission band of the second access point is busy, then the signal processing circuit 400 changes to detect other possible access points. If all the channels (i.e., access points) are busy, the signal processing circuit 400 causes the synthesizer 452 to switch back to the original frequency to support the data transmission between the first access point and the signal processing circuit 400 (step 816).

Furthermore, in order to prevent a phenomenon where when all channels are busy different access points are repeatedly detected, the signal processing circuit 400 waits a predetermined time period (step 818).

Please note, after the processing circuit 400 waits the predetermined time period, the signal processing circuit 400 can perform any one of two procedures. The first procedure is to re-evaluate the condition of the transmission band of the first access point to check whether to switch the access point to transfer data. For example, if the transmission condition of the first access point is good enough in the next detection, there is no need to switch the access point. The second procedure is to directly detect the condition of the channels of other access points for the following access point switching operation without re-evaluating the condition of the transmission band of the first access point (i.e., it assumes that the channel of the first access point is always busy).

Please note, besides smoothly switching bandwidths and switching access points, the present invention has other advantages. For example, because the two RF circuits 421 and 422 and the two synthesizers 451 and 452 can be operated in different bands, in an ad-hoc mode (i.e., when there is no access point limiting use to the 20 MHz bandwidth or the 40

MHz bandwidth), the signal processing circuit 400 can use one synthesizer to receive signal (e.g., utilized as Rx), and use the other synthesizer to detect the power of another 20 MHz channel. If the other 20 MHz channel is not busy, when the system needs to transfer signals (e.g., utilized as Tx), the entire system can be switched to immediately use the 40 MHz bandwidth to transfer data such that a high throughput can be achieved.

In addition, the signal processing circuit 400 can utilize one of the synthesizer (such as synthesizer 451) to receive signals, and utilize the other synthesizer (such as synthesizer 452) to transfer signals such that a bidirectional data transmission can be achieved and the transition time (from Rx to Tx or from Tx to Rx) can be removed.

Please note, in the above disclosure, each of the RF circuits 421 and 422 supports 20 MHz bandwidth. However, this is also regarded as an embodiment and is not a limitation of the present invention.

Furthermore, the above-mentioned mechanisms of detecting whether the channel is busy, such as detecting the signal power, RSSI, or CSR, are only utilized as embodiments and are not limitations of the present invention. In the actual implementations, any other mechanisms of detecting whether the channel is busy can be used, and this also falls in the scope of the present invention.

Moreover, in the above disclosure, the signal processing circuit 400 is used in WLAN field. However, the signal processing circuit 400 can be used to communicate with other signal transferring/receiving devices, and is not limited to communication with an access point or other WLAN devices.

Please note, the implementation of the synthesizers is well-known by one having average skills in the art therefore additional detailed information is omitted herein for the sake of brevity. As mentioned previously, the synthesizer is used to generate signals having a specific frequency (e.g., such as a clock signal). Therefore, the synthesizer can be implemented with a phase-locked loop (PLL).

Figure 9:
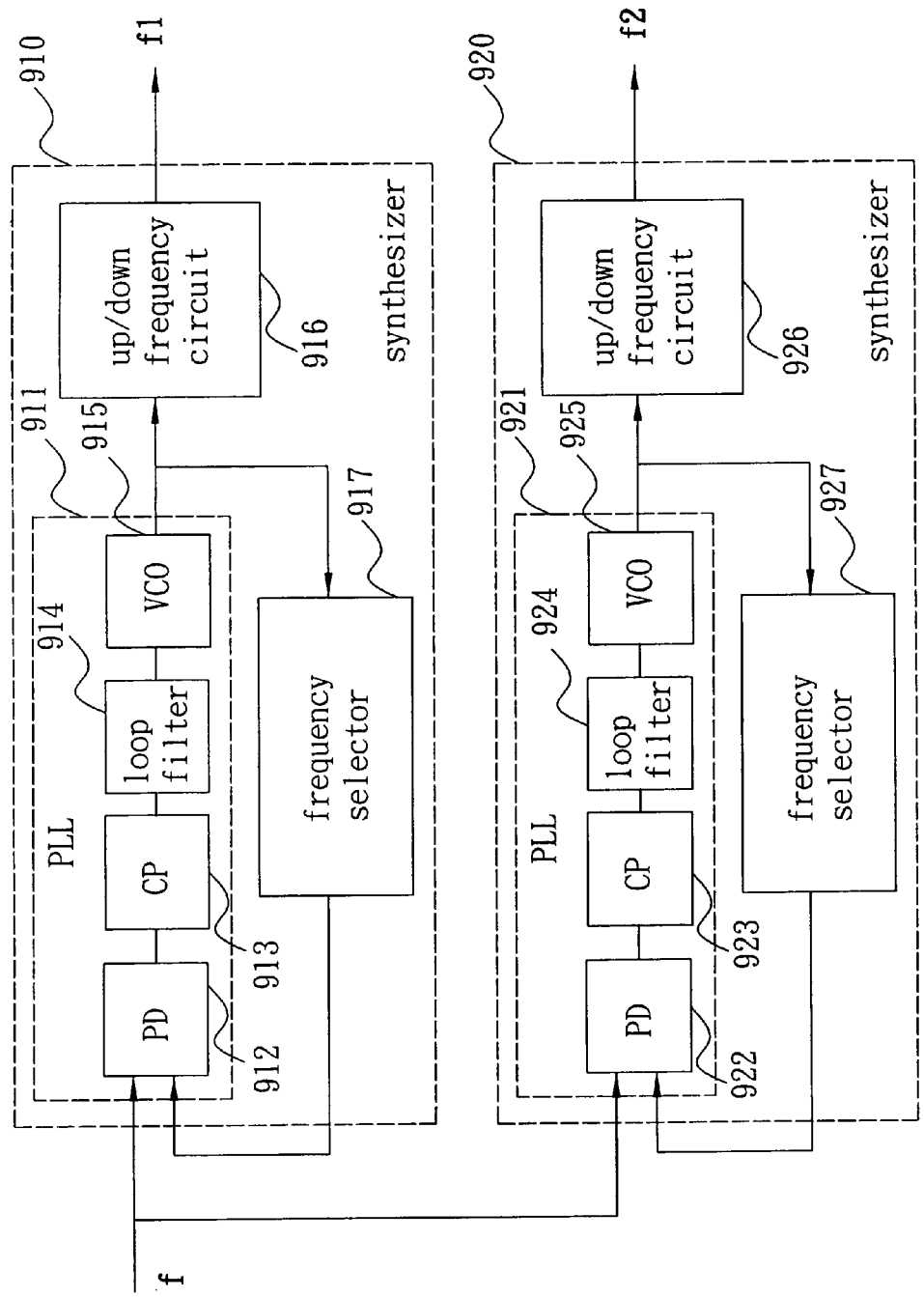
FIG. 9 is a functional block diagram of two synthesizers according to an embodiment of the present invention.

Please refer to FIG. 9. FIG. 9 is a functional block diagram of two synthesizers 910 and 920 according to an embodiment of the present invention. As shown in FIG. 9, each of the synthesizers 910 and 920 comprises a PLL 911, 921, an up/down frequency circuit 916, 926, and a frequency selector 917, 927.

The PLL 911, 921 comprises a phase detector (PD) 912, 922, a charge pump circuit (CP) 913, 923, a loop filter 914, 924, and a VCO 915, 925. Please note, in FIG. 9, components having the same name correspond to identical functions and operations. Furthermore, the function and the operation of the PLL is well-known by those having average skilled in the art, and further illustrations are omitted herein.

The PLL 911, 921 can output different frequencies according to the selection operation of the frequency selector 917, 927. For example, the frequency selector 917, 927 can be a divider having multiple dividing values (e.g., 2 or 3). Therefore, the PLL 911, 921 outputs signals having different frequencies according to the dividing value provided by the frequency selector 917, 927 (e.g., the output frequency may be different times of the input frequency f).

But the frequencies outputted by the PLL 911 and 921 may differ from the design value. Therefore, the up/down frequency circuits 916 and 926 are utilized to adjust the output frequencies of the PLL 911 and 921 such that desired frequencies f1 and f2 can be generated.

However, the synthesizers 910 and 920 shown in FIG. 9 are embodiments and are not limitations of the present invention.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A signal processing circuit utilized in a wireless local area network (WLAN) device for communicating with a network device utilizing a first band or a second band, comprising:
    a first synthesizer, for generating a first frequency;
    a first RF circuit, coupled to the first synthesizer, for receiving a first RF signal corresponding to the first band according to the first frequency and generating a first inner signal according to the first RF signal;
    a first analog front end (AFE) circuit, coupled to the first RF circuit, for receiving the first inner signal and generating the first digital signal according to the first inner signal;
    a second synthesizer, for generating a second frequency;
    a second RF circuit, coupled to the second synthesizer, for receiving a second RF signal corresponding to the second band according to the second band and generating a second inner signal according to the second RF signal;
    a second AFE circuit, coupled to the second RF circuit, for receiving the second inner signal and generating a second digital signal according to the second inner signal; and
    a baseband circuit, coupled to the first AFE circuit and the second AFE circuit, for processing the first digital signal and the second digital signal;
    wherein a central frequency of the first band is substantially equal to the first frequency, and a central frequency of the second band is substantially equal to the second frequency; and
    wherein when the first RF circuit communicates with the network device utilizing the first band, one of the baseband circuit and the second RF circuit further detects whether the second band is busy.

2. The signal processing circuit of claim 1, wherein when the second band is not busy, the second RF circuit simultaneously communicates with the network device utilizing the second band such that the signal processing circuit is allowed to communicate with the network device utilizing the first band and the second band.

3. The signal processing circuit of claim 1, wherein a time period when the second band is busy is greater than a predetermined time period, the second synthesizer changes to generate the first frequency to allow the first RF circuit and the second RF circuit to simultaneously communicate with the network device utilizing the first band.

4. The signal processing circuit of claim 1, wherein when the baseband circuit is used to detect whether the second band is busy, the baseband circuit comprises:
    a signal power evaluating module, for detecting a power of the second digital signal;
    wherein if the power of the second digital signal is less than a predetermined value, the baseband circuit determines that the second band is not busy.

5. The signal processing circuit of claim 1, wherein when the baseband circuit is used to detect whether the second band is busy, the baseband circuit further detects a carrier sense ratio of the second band, if the carrier sense ratio is less than a predetermined value, then the baseband circuit determines that the second band is not busy.

6. The signal processing circuit of claim 1, wherein when the second RF circuit is used to detect whether the second band is busy, the second RF circuit comprises:
   a signal power evaluating module, for detecting a power of the second RF signal;
   wherein if the power of the second RF signal is less than a predetermined value, the second RF circuit determines that the second band is not busy.

7. The signal processing circuit of claim 1, wherein when the second RF circuit is used to detect whether the second band is busy, the second RF circuit further detects a carrier sense ratio of the second band, if the carrier sense ratio is less than a predetermined value, then the second RF circuit determines that the second band is not busy.

8. The signal processing circuit of claim 1, wherein when the first RF circuit communicates with the network device utilizing the first band, the baseband circuit detects a transmission time period of at least one packet carried by the first digital signal, if the transmission time period is shorter than a predetermined threshold, the second synthesizer changes to generate the first frequency such that the second RF circuit is allowed to simultaneously communicate with the network device utilizing the first band.

9. A signal processing circuit utilized in a wireless local area network (WLAN) device for communicating with a network device utilizing a first band or a second band, comprising:
   a first synthesizer, for generating a first frequency;
   a first RF circuit, coupled to the first synthesizer, for receiving a first RF signal corresponding to the first band according to the first frequency and generating a first inner signal according to the first RF signal;
   a first analog front end (AFE) circuit, coupled to the first RF circuit, for receiving the first inner signal and generating the first digital signal according to the first inner signal;
   a second synthesizer, for generating a second frequency;
   a second RF circuit, coupled to the second synthesizer, for receiving a second RF signal corresponding to the second band according to the second band and generating a second inner signal according to the second RF signal;
   a second AFE circuit, coupled to the second RF circuit, for receiving the second inner signal and generating a second digital signal according to the second inner signal; and
   a baseband circuit, coupled to the first AFE circuit and the second AFE circuit, for processing the first digital signal and the second digital signal;
   wherein a central frequency of the first band is substantially equal to the first frequency, and a central frequency of the second band is substantially equal to the second frequency; and
   wherein the baseband circuit detects a transmission condition of the second band, if the transmission condition of the second band satisfies a predetermined condition, the baseband circuit determines that the second band is busy.

10. A signal processing circuit utilized in a WLAN for communicating with a first network device utilizing a first band or communicating with a second network device utilizing a second band, comprising:
    a first synthesizer, for generating a first frequency;
    a first RF circuit, coupled to the first synthesizer, for receiving a first RF signal corresponding to the first band according to the first frequency and generating a first inner signal according to the first RF signal;
    a first analog front end (AFE) circuit, coupled to the first RF circuit, for receiving the first inner signal and generating the first digital signal according to the first inner signal;
    a second synthesizer, for generating a second frequency;
    a second RF circuit, coupled to the second synthesizer, for receiving a second RF signal corresponding to the second band according to the second band and generating a second inner signal according to the second RF signal;
    a second AFE circuit, coupled to the second RF circuit, for receiving the second inner signal and generating a second digital signal according to the second inner signal; and
    a baseband circuit, coupled to the first AFE circuit and the second AFE circuit, for processing the first digital signal and the second digital signal;
    wherein a central frequency of the first band is substantially equal to the first frequency, and a central frequency of the second band is substantially equal to the second frequency; and
    wherein when the first RF circuit transfers signals to the first network device utilizing the first band, the baseband circuit further detects a transmission time period of at least one packet carried by the first digital signal, if the transmission time period is greater than a predetermined time period, then one of the baseband circuit and the second RF circuit further evaluates whether the second band is busy, and if the second band is busy, the first synthesizer changes to generate the second frequency such that the first RF circuit is switched to communicate with the second network device utilizing the second band.

11. The signal processing circuit of claim 10, wherein when the baseband circuit is used to evaluate whether the second band is busy, the baseband circuit comprises:
    a signal power evaluating module, for detecting a power of the second digital signal;
    wherein if the power of the second digital signal is less than a predetermined threshold, the baseband circuit determines that the second band is not busy.

12. The signal processing circuit of claim 10, wherein when the baseband circuit is used to evaluate whether the second band is busy, the baseband further detects a carrier sense ratio of the second band, if the carrier sense ratio is less than a predetermined threshold, then the baseband circuit determines that the second band is not busy.

13. The signal processing circuit of claim 10, wherein when the second RF circuit is used to evaluate whether the second band is busy, the second RF circuit comprises:
    a signal power evaluating module, for detecting a power of the second RF circuit;
    wherein if the power of the second RF signal is less than a predetermined value, then the second RF circuit determines that the second band is not busy.

14. The signal processing circuit of claim 10, wherein when the second RF circuit is used to evaluate whether the second band is busy, the second RF circuit further detects a carrier sense ratio of the second band, if the carrier sense ratio is less than a predetermined value, then the second RF circuit determines that the second band is not busy.

15. A signal processing circuit utilized in a wireless local area network (WLAN) device for communicating with a network device utilizing a first band or a second band, comprising:
    a baseband circuit, for generating a first digital signal and a second digital signal;

a first AFE circuit, coupled to the baseband circuit, for receiving the first digital signal and converting the first digital signal into a first inner signal;

a synthesizer, for generating a first frequency;

a first RF circuit, coupled to the first synthesizer and the first AFE circuit, for transforming the first inner signal into a first RF signal corresponding to the first band according to the first frequency;

a second AFE circuit, coupled to the baseband circuit, for receiving the second digital signal and converting the second digital signal into a second inner signal;

a second synthesizer, for generating a second frequency; and a second RF circuit, coupled to the second synthesizer and the second AFE circuit, for transforming the second inner signal into a second RF signal corresponding to the second band according to the second frequency;

wherein a central frequency of the first band is substantially equal to the first frequency, and a central frequency of the second band is substantially equal to the second frequency; and wherein when the first RF circuit communicates with the network device utilizing the first band, the baseband circuit further detects whether the second band is busy.

16. The signal processing circuit of claim 15, wherein the baseband circuit comprises:

a signal power evaluating module, for detecting a power of the second digital signal;

wherein if the power of the second digital signal is less than a predetermined value, the baseband circuit determines that the second band is not busy.

17. The signal processing circuit of claim 15, wherein the baseband circuit further detects a carrier sense ratio of the second band, if the carrier sense ratio is less than a predetermined value, then the baseband circuit determines that the second band is not busy.

18. A signal processing circuit utilized in a wireless local area network (WLAN) device for communicating with a network device utilizing a first band or a second band, comprising:

a baseband circuit, for generating a first digital signal and a second digital signal;

a first AFE circuit, coupled to the baseband circuit, for receiving the first digital signal and converting the first digital signal into a first inner signal;

a synthesizer, for generating a first frequency;

a first RF circuit, coupled to the first synthesizer and the first AFE circuit, for transforming the first inner signal into a first RF signal corresponding to the first band according to the first frequency;

a second AFE circuit, coupled to the baseband circuit, for receiving the second digital signal and converting the second digital signal into a second inner signal;

a second synthesizer, for generating a second frequency; and a second RF circuit, coupled to the second synthesizer and the second AFE circuit, for transforming the second inner signal into a second RF signal corresponding to the second band according to the second frequency;

wherein a central frequency of the first band is substantially equal to the first frequency, and a central frequency of the second band is substantially equal to the second frequency; and wherein when the first RF circuit communicates with the network device utilizing the first band, the second RF circuit further detects whether the second band is busy.

19. The signal processing circuit of claim 18, wherein when the second band is not busy, the second RF circuit simultaneously communicates with the network device utilizing the second band such that the signal processing circuit is allowed to communicate with the network device utilizing both the first band and the second band.

20. The signal processing circuit of claim 18, wherein a time period of when the second band is busy is greater than a predetermined time period, the second synthesizer changes to generate the first frequency such that the first RF circuit and the second RF circuit are allowed to simultaneously communicate with the network device utilizing the first band.

* * * * *